Jan. 26, 1932.  V. VALLETTA  1,842,636

VARIABLE SPEED GEARING, PARTICULARLY FOR MOTOR VEHICLES

Filed April 2, 1929

Inventor,
Vittorio Valletta,
By Henry Ortly
att.

Patented Jan. 26, 1932

1,842,636

UNITED STATES PATENT OFFICE

VITTORIO VALLETTA, OF TURIN, ITALY, ASSIGNOR TO FIAT SOCIETÁ ANONIMA, OF TURIN, ITALY

VARIABLE SPEED GEARING, PARTICULARLY FOR MOTOR VEHICLES

Application filed April 2, 1929, Serial No. 351,971, and in Italy November 2, 1928.

This invention relates to variable speed gearing, particularly for motor vehicles, of the type including gear pinions with internal teeth to ensure quieter transmission. In the known systems, the employment of internally toothed pinions, which is usually restricted to the ratio of transmission directly below the direct drive, always implies a not inconsiderable increase in the length of the gear box. According to the present invention, however, two or more sets of (reducing) gears for the same speed are disposed in the same plane, thus obviating the aforesaid increase in length.

This and other features of the invention will now be described with reference to the accompanying drawings, which illustrate, by way of example, an embodiment of my improved variable gearing. In the example shown, the gearing is of the four-speed type, the fourth speed being by direct drive, the third speed by an internally-toothed pinion gear, and the second and first speeds being transmitted through a countershaft and pinion gear mounted on a sliding sleeve in the usual manner.

Figure 1:
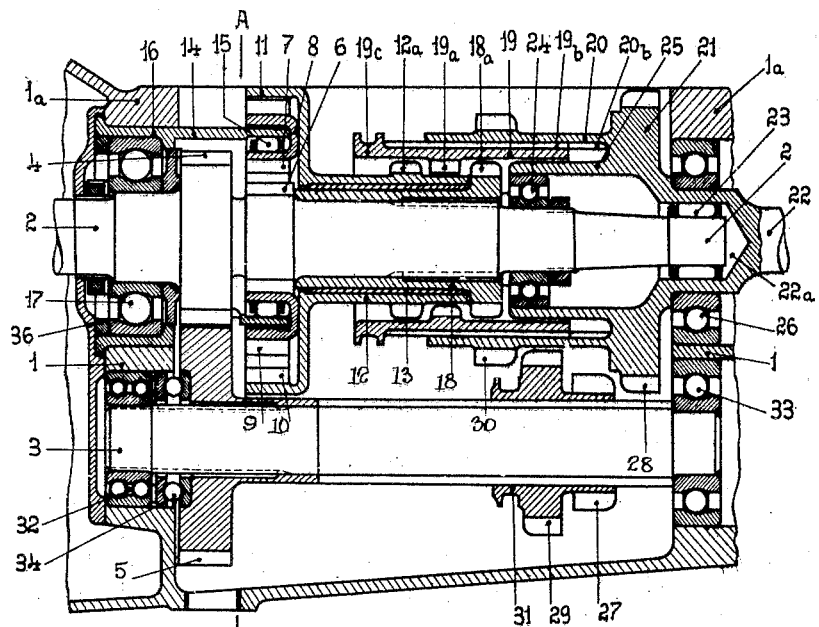

Fig. 1 of the drawings represents a longitudinal section through the variable gearing.

Figure 2:
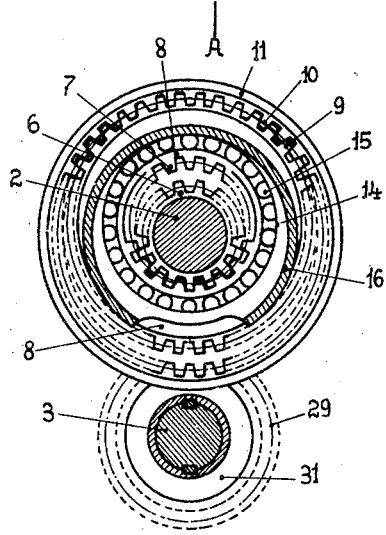
Figure 3:
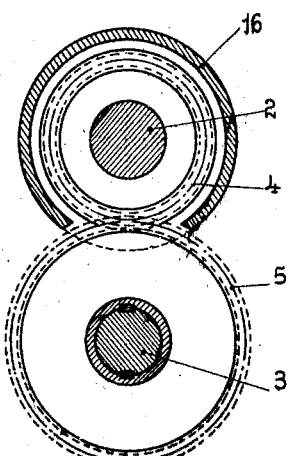

Figs. 2 and 3 are cross sections along the line A—A of Fig. 1, as viewed respectively in the direction of transmission to the driven shaft, and in the direction of the engine.

The gear box is in two parts 1 and 1a, and houses the engine shaft 2 and the countershaft 3. The engine shaft 2 carries a helicoidal pinion 4, which is always in gear with a pinion 5 keyed on the countershaft 3, and a pinion 6 which is always in gear with the internal set of teeth 7 of a C-section ring 8. The ring 8 is also provided with an external set of teeth 9 always in gear with the internal teeth 10 of a crown 11 integral with a sleeve 12 which is co-axial with the engine shaft 2 and mounted thereon by means of a bush 13. Said ring 8 is eccentrically disposed in relation to the engine shaft, and is overhung on an annular support 14 by means of rollers 15.

The support 14 forms part of a member comprising a ring 16 which is gripped between the two sections 1 and 1a of the gearbox and houses a ball bearing 17 for the engine shaft. The member 14:16 has a gap at its under side through which the pinions 4 and 5 engage. Beyond the aforesaid pinion 6, and in correspondence with the sleeve 12, there is keyed on the engine shaft a sleeve 18 provided at the extremity with teeth 18a adapted to engage between the teeth 19a of a toothed sleeve 19, which is slidably mounted in a sleeve 20 by tongue and groove mechanism 19b and 20b. Said teeth 19a of the sleeve 19 are also adapted to gear with teeth 12a on the sleeve 12.

It will be seen that the sleeve 20 is carried by a member 21 forming part of the transmission shaft 22 of the vehicle, that the engine shaft 2 has a terminal support on rollers 23 disposed in a recess 22a in the shaft 22, and that said engine shaft also has an intermediate support (in correspondence with the teeth of the second speed) on a ball bearing 24 housed in a sleeve 25 integral with the member 21. The transmission shaft 22 itself is supported by a ball bearing 26 held between the two sections 1 and 1a of the gearbox. For the purpose of actuating the slidable sleeve 19 a fork (not shown) engages a collar 19c on the sleeve in a manner similar to the usual slidable gear mechanism.

The variable gearing is completed by mechanism—axially displaceable on the countershaft 3—comprising a collar 31 with pinions 27 and 29 adapted to gear with the sets of teeth 28 and 30 carried respectively by the member 21 and its sleeve 20. Said countershaft 3 is supported, at one end, by bearings 32 and 34 and, at the other end, by a bearing 33. A frontal cap 36 is fitted to the box 1:1a on the engine side.

With the variable gearing described the first and second speeds are obtained in the usual manner, namely that the transmission from the engine shaft 2 to the driven shaft 22 is effected through the pair of pinions 4:5 (which are always in gear) and one or other of the two pairs of pinions 27:28 and 29:30, according as the collar 31 with the gears 27:29 is moved towards the right or towards the left by fork actuating mechanism not shown. When the gearing is set for the first or second speed, the sleeve 19 is in the free position, that is to say its teeth 19a are not in mesh either with the teeth 12a on the left or with the teeth 18a on the right. On the other hand, when set for third or fourth speed, the pinions 29 and 27 are in the free position.

For third speed, the sleeve 19 is moved towards the left by means of the fork (not shown) that engages in the collar 19c, so that its teeth 19a gear with the teeth 12a of the sleeve 12. Owing to the presence of the tongue and groove mechanism 19b:20b between the sleeves 19:20, the sleeve 12 then becomes integrally connected with the driven shaft 22. Rotation of the engine shaft 2 is thus transmitted, with the desired reduction ratio, to the driven shaft 22, through the pairs of continuously meshing pinions 6:7 and 9:10, the crown 11 of the set of teeth 10 forming part of the sleeve 12.

For fourth speed, the sleeve 19 is moved towards the right so that its teeth 19a gear with the teeth 18a of the sleeve 18 keyed on the engine shaft 2. Through the mechanism 19b:20b, the movement of the engine shaft is then transmitted to the driven shaft 22 as a direct drive, that is, as though they were one.

Obviously, the forks for the collars 19c and 31 may be actuated by any suitable sliding mechanisms such as are used for ordinary variable gearing. Also the constructional details may be altered without departing from the scope of the invention, according to the type of speed changing, the number of speeds, and so forth.

What I claim is:

1. In a variable speed gearing the combination with a gear-box, an engine shaft and a transmission shaft placed in alignment in said box, a ring arranged in another box for supporting the engine shaft and having an inner annular projection eccentric to the axis of said shaft, a C-shaped ring having an internal and an external set of teeth, said annular projection being fitted into the groove of said C-shaped ring for supporting same, a pinion on the engine shaft meshing with the internal set of teeth and a crown with internal teeth meshing with the external set of teeth of said ring and fast with a sleeve loosely mounted on the engine shaft and provided with teeth, a second sleeve keyed on the engine shaft and provided with teeth, an axially slidable sleeve provided with teeth that can be caused to mesh with the teeth of the first and second sleeve respectively, and a supporting member for the movable sleeve, fast with the transmission shaft.

2. In a variable speed gearing the combination with a gear-box, an engine shaft and a transmission shaft placed in alignment in said box, a countershaft mounted in said box parallel to the engine and transmision shafts, of a member for supporting the engine shaft having an annular eccentric projection to said engine shaft, a ring arranged on said annular eccentric projection and having an internal and an external set of teeth, a pinion on said engine shaft arranged in said annular projection and meshing with a pinion on the countershaft through an opening in said annular projection, a second pinion on the engine shaft meshing with the internal set of teeth of said ring, a sleeve loosely mounted on said engine shaft and having an internal set of teeth meshing with the external set of teeth of said ring, a stationary clutch member on said engine shaft, a second stationary clutch member on said sleeve, a movable clutch member arranged on the transmission shaft so as to come into engagement with one of the said stationary clutch members or into the unclutched position, a couple of pinions on the transmission shaft and sliding double change speed pinions mounted on the countershaft, in order to be brought into engagement with one of said sets of teeth and into the position of rest.

In testimony that I claim the foregoing as my invention, I have signed my name.

VITTORIO VALLETTA.